United States Patent

Ikawa

[11] Patent Number: 6,147,783
[45] Date of Patent: Nov. 14, 2000

[54] OPTICAL TRANSMISSION SYSTEM WHEREIN PROTECTION TERMINAL EQUIPMENT CONVERTS ALARM INDICATION SIGNAL BEFORE RELAYING SAME TO WORKING TERMINAL EQUIPMENT

[75] Inventor: Fumihiro Ikawa, Kawasaki, Japan

[73] Assignee: Fujitsu Limited, Kawasaki, Japan

[21] Appl. No.: 08/475,438

[22] Filed: Jun. 7, 1995

Related U.S. Application Data

[63] Continuation of application No. 08/019,361, Feb. 18, 1993, abandoned, and a continuation of application No. 08/285,434, Aug. 4, 1994, abandoned.

[30] Foreign Application Priority Data

Feb. 18, 1992 [JP] Japan .................................. 4-031066

[51] Int. Cl.$^7$ ........................................... H04J 14/00
[52] U.S. Cl. ............................................... 359/110
[58] Field of Search ......................... 359/110, 115, 359/117, 124, 152, 157, 164, 172, 173, 176, 177

[56] References Cited

U.S. PATENT DOCUMENTS

| | | | |
|---|---|---|---|
| 4,211,920 | 7/1980 | Wakabayashi | 359/110 |
| 4,278,850 | 7/1981 | Sato et al. | 359/177 |
| 4,393,493 | 7/1983 | Edwards | 359/110 |
| 4,451,916 | 5/1984 | Casper et al. | 359/110 |
| 4,837,760 | 6/1989 | Reid et al. | 359/110 |
| 5,069,521 | 12/1991 | Hardwick | 359/110 |
| 5,091,796 | 2/1992 | Nishimura et al. | 359/110 |
| 5,327,275 | 7/1994 | Yamane et al. | 359/110 |

*Primary Examiner*—Bhavesh Mehta
*Attorney, Agent, or Firm*—Staas & Halsey LLP

[57] ABSTRACT

An optical transmission system containing a protection system and a plurality of working systems. When a trouble occurs in the protection system to which one of the working system is switched, a line alarm indication signal (LINE AIS), which can be detected in a reception portion of a piece of terminal equipment, and can activate a switch control circuit, is transmitted to a piece of terminal equipment on the reception side. In response to the receipt of the line alarm indication signal (LINE AIS), the piece of terminal equipment on the reception side transmits a far end receive failure signal (FERF) through an protection system optical transmission line (PTCT2) to a piece of protection system terminal equipment on the transmission side, and transmits a path alarm indication signal (PATH AIS) which does not activate the switch control circuit, through an optical transmission line in the same terminal station to the pieces of working system terminal equipment in the same terminal station on the reception side.

8 Claims, 10 Drawing Sheets

| | | |
|---|---|---|
| FRAMING A1 | FRAMING A2 | STS-1 ID C1 |
| BIP-8 B1 | ORDERWIRE E1 | USER F1 |
| DATA COM D1 | DATA COM D2 | DATA COM D3 |
| POINTER H1 | POINTER H2 | POINTER ACTION H3 |
| BIP-8 B2 | APS K1 | APS K2 |
| DATA COM D4 | DATA COM D5 | DATA COM D6 |
| DATA COM D7 | DATA COM D8 | DATA COM D9 |
| DATA COM D10 | DATA COM D11 | DATA COM D12 |
| GROWTH Z1 | GROWTH/FEBE Z2 | ORDERWIRE E2 |

SECTION OVERHEAD: rows 1-3
LINE OVERHEAD: rows 4-9

OPTICAL TRANSMISSION SYSTEM WHEREIN PROTECTION TERMINAL EQUIPMENT CONVERTS ALARM INDICATION SIGNAL BEFORE RELAYING SAME TO WORKING TERMINAL EQUIPMENT

CROSS-REFERENCE TO RELATED APPLICATION

This application is a continuation, of application Ser. Nos. 08/019,361 and 08/285,434, filed Feb. 18, 1993 and Aug. 4, 1994, respectively, now abandoned.

This application relates to application Serial No. 07/784,211, filed Oct. 30, 1991, now U.S. Pat. No. 5,327,275 and assigned to the same assignee as the subject application.

BACKGROUND OF THE INVENTION (1) Field of the Invention

The present invention relates to an optical transmission system wherein two terminal stations are connected with at least one working system optical transmission line and one protection system optical transmission line, each terminal station contains pieces of optical working system terminal equipment and the protection system corresponding to the optical transmission lines which the terminal station accommodates, and the optical protection system terminal equipment and the optical working system terminal equipment are connected with an optical transmission line in the terminal station. Explanations are given in the above application Ser. No. 07/784,211 for various aspects of such an optical transmission system.

In particular, the characteristic feature of the present invention resides in a control operation in the optical protection system terminal equipment when trouble occurs in the protection system.

(2) Description of the Related Art

Figure 1:
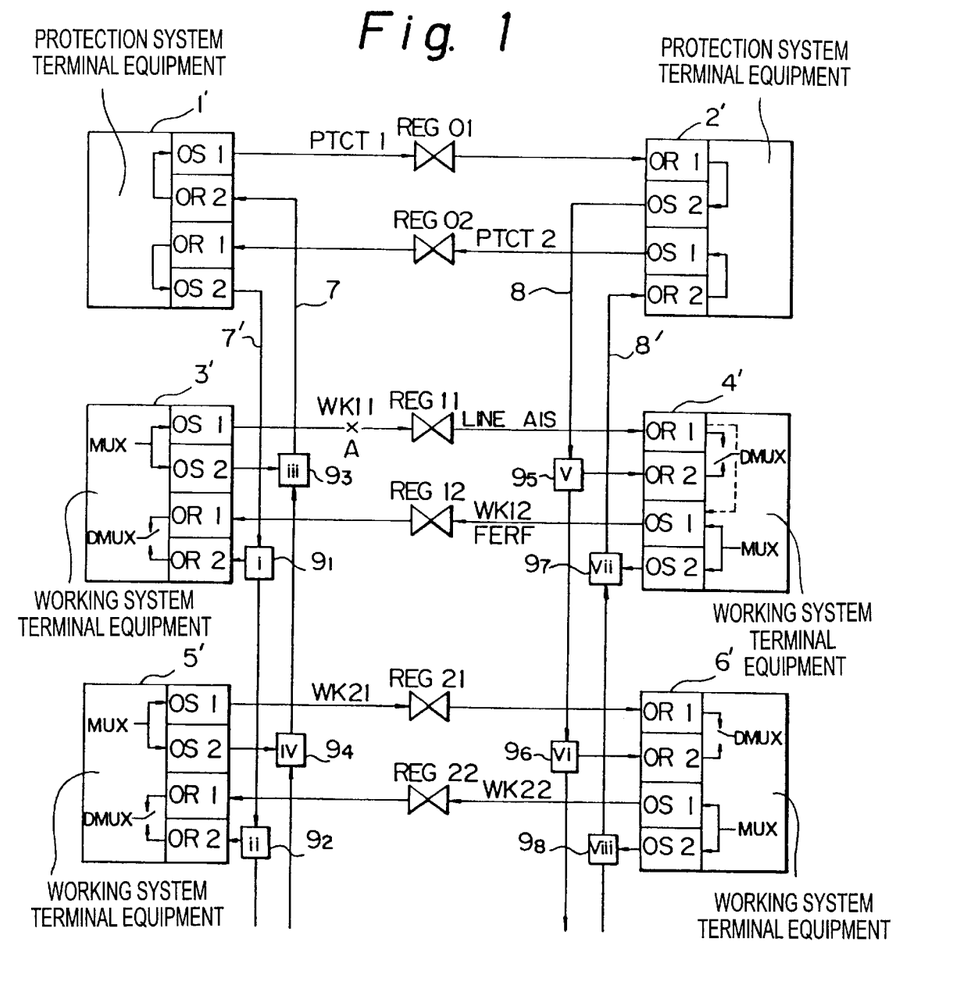
FIG. 1 is a diagram illustrating an example construction of a conventional optical transmission system wherein, in each terminal station, an optical protection system terminal equipment and pieces of optical working system terminal equipment are connected with an optical transmission line in the terminal station, and the optical protection system terminal equipment relays between an protection system optical transmission line and the optical transmission line in the terminal station.

FIG. 1 is a diagram illustrating an example construction of an optical transmission system wherein two terminal stations are connected with at least one working system optical transmission line and one protection system optical transmission line, each terminal station contains pieces of optical working system terminal equipment and the protection system corresponding to the optical transmission lines which the terminal station accommodates, and the optical protection system terminal equipment and the optical working system terminal equipment are connected with an optical transmission line in the terminal station.

In FIG. 1, reference numerals 1' and 2' each denote a piece of protection system terminal equipment; 3', 4', 5', and 6' each denote a piece of working system terminal equipment, PTCT1 and PTCT2 denote a pair of protection system optical transmission lines where one of the pair transmits optical signals in one direction and the other of the pair transmits optical signals in the opposite direction; WK11 and WK12 denote a first pair of working system optical transmission lines where one of the pair transmits optical signals in one direction and the other of the pair transmits optical signals in the opposite direction; WK21 and WK22 denote a second pair of working system optical transmission lines where one of the pair transmits optical signals in one direction and the other of the pair transmits optical signals in the opposite direction; REG01 to REG22 each denote an optical regenerating repeater; 7, 7', 8, and 8' each denotes an optical transmission line in each terminal station; 91, 92, 95, and 96 each denotes an optical coupler; and 93, 94, 97, and 98 each denotes an optical switch. Further, in each terminal equipment, OS1 and OS2 denote a first and second optical transmission portions, and OR1 and OR2 denote a first and second optical reception portions.

In FIG. 1, the protection system terminal equipment 1', the pieces 3' and 5' of working system terminal equipment, the optical transmission lines 7 and 7', the optical couplers 91 and 92, the optical switches 93 and 94, and a switch control circuit (not shown), are provided in one of the terminal stations; and the protection system terminal equipment 2', the pieces 4' and 6' of working system terminal equipment, the optical transmission lines 8 and 8', the optical couplers 95 and 96, the optical switches 97 and 98, and a switch control circuit, are provided in the other of the terminal stations.

In each working system terminal equipment, tributary (electric) signals are multiplexed by the multiplexer (denoted by MUX in the drawing), and the multiplexed electric signals are supplied to the first and second optical transmission portions OS1 and OS2 in parallel. The multiplexed electric signals are converted to an optical signal in the first and second optical transmission portions OS1 and OS2 to output the same onto the optical transmission line.

In the above construction, the first optical transmission portion OS1 in each piece of working system terminal equipment accommodates one of the working system optical transmission lines WK11 to WK22, which is connected to the opposite terminal station (the other terminal station which is located opposite to the terminal station containing the above piece of working system terminal equipment). An optical signal output from the first optical transmission portion OS1, is transmitted through the working system optical transmission line, regenerated by one of the optical regenerating repeaters REG01 to REG22 which are provided on the optical transmission line. Then, the optical signal is received by the first reception portion OR1 in the corresponding piece of working system terminal equipment in the opposite terminal station. The received optical signal is converted to an electric signal in the first reception portion OR1. When the working system optical transmission line is used, the demultiplexer, which is denoted by DMUX in the drawing, is connected on the output side of the first reception portion OR1 in each working system terminal equipment. The above (multiplexed) electric signal output from the first reception portion OR1, is demultiplexed in the demultiplexer, and is then output as a tributary (electric) signal onto a transmission line on the tributary side.

In the above construction, when trouble occurs, for example, in the optical transmission line WK11, as indicated by "A" in FIG. 1, the optical regenerating repeater REG11, which is located downstream of the location of the trouble, detects the trouble as an abnormality in a signal received thereat. For example, in the SONET (Synchronous Optical Network) system, the optical regenerating repeater REG11 generates an alarm indication signal (LINE AIS) in response to the abnormal signal to inform the terminal station located downstream of the optical regenerating repeater REG11 about the abnormality. When a reception portion OR1 detects loss of a receiving signal, or the above alarm indication signal (LINE AIS), the reception portion OR1 sends a switch trigger signal (SW TRG) to the switch control circuit in the same terminal station, and activates the first transmission portion OS1 in the same working system terminal equipment to transmit a far end receive failure signal (FERF) to the working system terminal equipment 3' through the other optical transmission line WK12 which makes the pair together with the above optical transmission line through which the above reception portion 0R1 received the alarm indication signal (LINE AIS). When the first reception portion 0R1 in the working system terminal equipment 3' receives the above far end receive failure signal (FERF), the first reception portion 0R1 sends a switch trigger signal (SW TRG) to the switch control circuit in the same terminal station.

The switch control circuit in each terminal station monitors an output of the switch trigger signal (SW TRG) from the reception portion in each working system terminal equipment and protection system terminal equipment in the terminal station, and determines which working system terminal equipment is to be switched to the protection system optical transmission line. Based on the above determination, the switch control circuit connects each working system terminal equipment with a working system optical transmission line, or with the protection system terminal equipment through the optical transmission lines 7 and 7', or 8 and 8' in each terminal station. For example, in the construction of FIG. 1, when one of the pieces of working system terminal equipment is connected to the corresponding one of the working system optical transmission lines, one of the optical switches (a corresponding one of the switches 93, 94, 97, or 98), which receives an output of the second transmission portion 0S2 in the working system terminal equipment, stops the output, and the switch control circuit makes a connection so that the demultiplexer DMUX in the working system terminal equipment selects the output of the first reception portion to input thereto. On the other hand, when each working system terminal equipment is connected to the protection system terminal equipment through the optical transmission lines 7 and 7', or 8 and 8' in the terminal station, one of the optical switches (a corresponding one of the switches 93, 94, 97, or 98), which receives an output of the second transmission portion 0S2 in the working system terminal equipment, selects the output to input thereto, and the switch control circuit makes a connection so that the demultiplexer DMUX in the working system terminal equipment selects the output of the second reception portion to input thereto. Thus, the second reception portion is connected through the optical coupler (a corresponding one of the optical couplers 91, 92, 95, and 96) and optical transmission line 7' to the protection system terminal equipment in the same terminal station.

Further, as explained in the copending application Ser. No. 784,211, when switches are provided so that the output of the multiplexer MUX in each working system terminal equipment is supplied to only one of the first and second transmission portions 0S1 and 0S2, each of the optical switches 93, 94, 97, and 98 may be replaced with an optical coupler. When the optical switches 93, 94, 97, and 98 are replaced with optical couplers, the switch control circuit in each terminal station controls the second transmission portion in each working system terminal equipment so that only one second transmission portion in one piece of working system terminal equipment, which is to be connected to the protection system terminal equipment, outputs an optical signal to the corresponding optical coupler.

Each protection system terminal equipment receives at the second reception portion 0R2 thereof the output of the second transmission portion 0S2 of the above one working system terminal equipment in the same terminal station through the optical transmission lines 7 or 8' in the terminal station, converts the output to an electric signal, and then converts the electric signal to an optical signal in the first transmission portion 0S1 thereof to transmit the same through the protection system optical transmission line PTCT1 or PTCT2 to the protection system terminal equipment in the opposite terminal station (which is referred to below as a second terminal station).

The protection system terminal equipment in the second terminal station receives at the first reception portion 0R1 thereof the above optical signal transmitted through the protection system optical transmission line PTCT1 or PTCT2, converts the optical signal to an electric signal, and then converts the electric signal to an optical signal in the second transmission portion 0S2 thereof to transmit the same through the optical transmission line 7' or 8 in the second terminal station to one of the pieces of the working system terminal equipment in the second terminal station. This piece of the working system terminal equipment is located opposite to the above piece of working system terminal equipment, connected to the protection system terminal equipment in the above terminal station which is opposed to the second terminal station. As explained above, in the construction described in the copending application Ser. No. 784,211, each protection system terminal equipment in each terminal station has a function of an optical regenerating repeater provided between an protection system optical transmission line and an optical transmission line in the terminal station.

Figure 2:
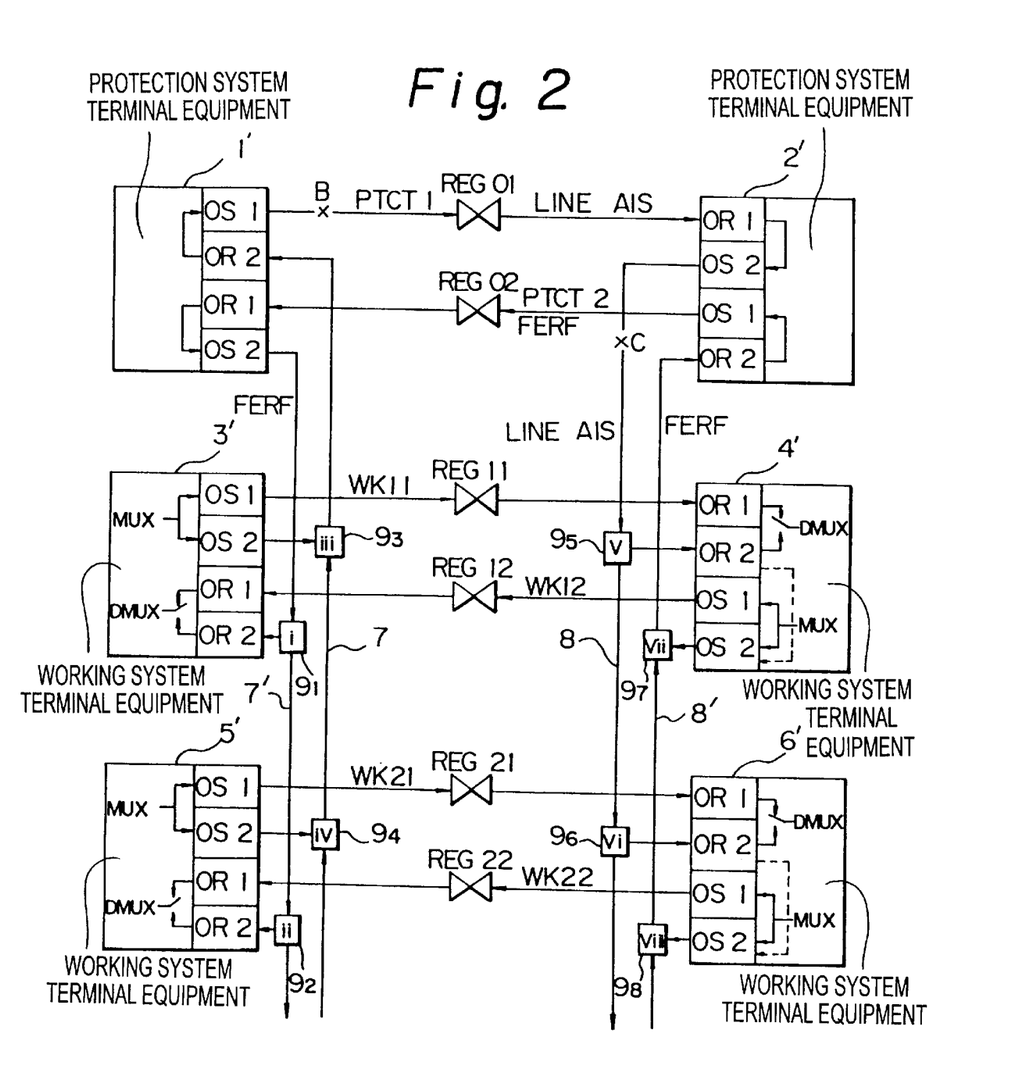
FIG. 2 is a diagram illustrating flows of signals in the construction of FIG. 1 when trouble occurs on the protection system optical transmission line or the optical transmission line in the terminal station.

A case is considered below wherein trouble "B" occurs in the protection system optical transmission line PTCT1, as indicated in FIG. 2, in the condition that the switching to the protection system optical transmission line is made.

In this case, the trouble is detected as an abnormality in a received signal at the optical regenerating repeater REG01 downstream of the location of the trouble. In response to the abnormal signal, the optical regenerating repeater REG01 generates an alarm indication signal (LINE AIS) to inform the protection system terminal equipment 2', downstream of the optical regenerating repeater REG01 of the abnormality. When each reception portion 0R1 in the protection system terminal equipment 2' detects a loss of a receiving signal or the above alarm indication signal (LINE AIS), the reception portion 0R1 sends a switch trigger signal (SW TRG) to the switch control circuit in the same terminal station, and activates the first transmission portion 0S1 in the same working system terminal equipment to transmit a far end receive failure signal (FERF) to the protection system terminal equipment 1' through the other optical transmission line PTCT2 which makes the pair together with the above optical transmission line through which the above reception portion 0R1 received the alarm indication signal (LINE AIS). When the first reception portion 0R1 in the protection system terminal equipment 1' receives the above far end receive failure signal (FERF), the first reception portion 0R1 sends a switch trigger signal (SW TRG) to the switch control circuit in the same terminal station.

According to the function of the optical regenerating repeater, each of the pieces 1' and 2' of protection system terminal equipment supplies the alarm indication signal (LINE AIS) or far end receive failure signal (FERF) which is received at the first reception portion 0R1 thereof, to the pieces of working system terminal equipment in the same terminal station, which pieces are connected to the above each piece 1' and 2' of protection system terminal equipment through the optical transmission lines 7' and 8 in each terminal station. Each of the first and second reception portions in each working system terminal equipment has a function of generating a switch trigger signal (SW TRG) to transmit the same to the switch control circuit in the same terminal station when the alarm indication signal (LINE AIS), the far end receive failure signal (FERF), or, the loss of an input is received. Therefore, the switch trigger signals (SW TRG) are simultaneously generated from the second reception portions OR2 in all the working system terminal equipment in each terminal station, to be transmitted to the switch control circuit in each terminal station, since the alarm indication signal (LINE AIS) or far end receive failure signal (FERF) is simultaneously supplied to the second reception portion OR2 in all the pieces of working system terminal equipment from the protection system terminal equipment, which functions as an optical regenerating repeater. In this case, the switch control circuit in each terminal station cannot recognize the real situation as to which optical transmission line trouble has occurred.

In addition, when trouble occurs on the optical transmission line 8 in the terminal station as indicated by "C" in FIG. 2, the trouble is simultaneously detected as loss of a signal input in the second reception portions OR2 in the pieces of working system terminal equipment, which pieces are located downstream of the location "C", and the above switch trigger signal (SW TRG) is transmitted to the switch control circuit. Therefore, when the above trouble "B" on the protection system transmission line PTCT1, and the trouble "C" on the optical transmission line 8 in the terminal station simultaneously occur, the switch control circuit cannot recognize the real situation.

Further, switches are provided so that the output of the multiplexer MUX in each working system terminal equipment is supplied to only one of the first and second transmission portions OS1 and OS2, and the optical switches 93, 94, 97, and 98 are respectively replaced with optical couplers, while far end receive failure signals (FERF) are output from the second transmission portions OS2 in all the pieces of working system terminal equipment, in response to the alarm indication signal (LINE AIS), where the alarm indication signal (LINE AIS) is supplied to all the pieces of working system terminal equipment. The far end receive failure signals (FERF) are input to the second reception portion OR2 in the protection system terminal equipment through the respectively corresponding optical couplers 93, 94, 97, and 98, where the far end receive failure signals (FERF) are superimposed with each other at the input. Therefore, there is a risk that the second reception portion OR2 in the protection system terminal equipment is damaged due to receipt of an optical signal having an intensity more than a predetermined intensity.

It may be possible to preset the terminal stations so that only one of the plurality of pieces of working system terminal equipment can output the far end receive failure signal (FERF) to prevent the input of the superimposed signal at the reception portion OR2. However, in this case, the optical/electric converters OR2 in the pieces 3' and 5' of working system terminal equipment will receive the far end receive failure signal (FERF) which is commonly transmitted thereto. Therefore, it is difficult to determine which piece of terminal equipment is to be switched to the protection system.

SUMMARY OF THE INVENTION

The object of the present invention is to provide an optical transmission system wherein a signal activating a switch control circuit is not generated in a piece of terminal equipment in a working system when trouble occurs on a optical transmission line in a protection system.

According to the first aspect of the present invention, there is provided an optical transmission system which contains: at least one pair of optical transmission lines in a working system, where one optical transmission line in the pair transmits an optical signal in one direction and the other optical transmission line in the pair transmits an optical signal in the opposite direction; a pair of optical transmission lines in a protection system, where one optical transmission line in the pair transmits an optical signal in one direction and the other optical transmission line in the pair transmits an optical signal in the opposite direction; at least one combination of first and second pieces of optical working system terminal equipment, provided at first and second ends of the at least one pair of working system optical transmission lines, for terminating each of the at least one pair of working system optical transmission lines; a combination of first and second pieces of optical protection system terminal equipment, provided at first and second ends of the pair of protection system optical transmission lines, for terminating the pair of protection system optical transmission lines; an optical signal repeater provided on each of the optical transmission lines in the at least one pair of working system optical transmission lines and the pair of protection system optical transmission lines; a first bidirectional optical transmission line for connecting the first piece of optical protection system terminal equipment with the first piece of optical working system terminal equipment in each of the at least one combination of first and second pieces of optical working system terminal equipment; and a second bidirectional optical transmission line for connecting the second piece of optical protection system terminal equipment with the second piece of optical working system terminal equipment in each of the at least one combination of first and second pieces of optical working system terminal equipment. In the optical transmission system, the first optical protection system terminal equipment contains a first relaying unit for relaying a signal transmitted through the protection system optical transmission line which optical transmission line is terminated by the first piece of protection system terminal equipment, to the first bidirectional optical transmission line; and the second piece of optical protection system terminal equipment, contains a second relaying unit for relaying a signal transmitted through the protection system optical transmission line which optical transmission line is terminated by the second piece of protection system terminal equipment, to the second bidirectional optical transmission line. Each of the optical signal repeaters contains a first alarm indication signal generating unit for detecting an abnormality in an optical signal received by the optical signal repeater, to generate a line alarm indication signal and transmit the line alarm indication signal through the optical transmission line on which the each optical signal repeater is provided, toward a downstream side of the optical transmission line. Each of the first and second pieces of optical protection system terminal equipment and the at least one combination of first and second pieces of optical working system terminal equipment contains a first alarm indication signal detecting unit for receiving and detecting the first alarm indication signal which is transmitted through one of the protection system optical transmission lines and the working system, where the each piece of terminal equipment is located on the reception side of the optical transmission line. Each of the first and second relaying units in the first and second pieces of optical protection system terminal equipment contains a second alarm indication signal generating unit for generating a second alarm indication signal to transmit the second alarm indication signal through a corresponding one of the first and second bidirectional optical transmission lines, in response to the detection of the first alarm indication signal, without relaying the first alarm indication signal, where the first alarm indication signal detecting units in the first and second optical working system terminal equipment do not detect the second alarm indication signal, and the second alarm indication signal indicates an occurrence of abnormality in the protection system optical transmission line.

According to the second aspect of the present invention, in addition to the above construction of the first aspect of the present invention, each piece of terminal equipment in the first and second pieces of optical protection system terminal equipment and the at least one combination of first and second pieces of optical working system terminal equipment contains: a far end receive failure signal generating unit for generating a far end receive failure signal (FERF), indicating that a signal received by an opposite terminal station is abnormal, in response to detection of the first alarm indication signal, and transmitting the far end receive failure signal through one of the optical transmission lines which makes one of the at least one pair together with the optical transmission line through which the each piece of terminal equipment has received the first alarm indication signal; and a far end receive failure signal detecting unit for detecting reception of the far end receive failure signal which is transmitted from a piece of terminal equipment opposed to the each piece of terminal equipment. Each of the first and second relaying units in the first and second pieces of optical protection system terminal equipment contains a far end receive failure signal deleting unit for deleting the far end receive failure signal in response to detection of the far end receive failure signal, without relaying the far end receive failure signal.

Figure 3:
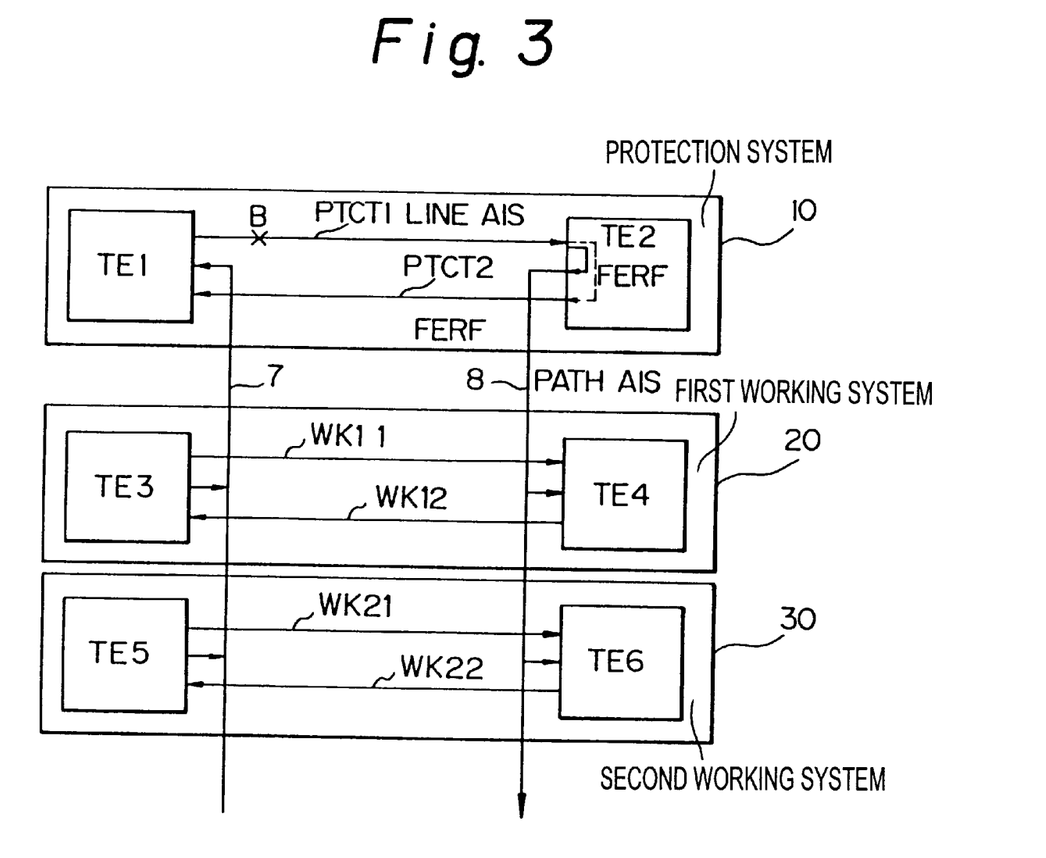
FIG. 3 is a diagram illustrating an outline of the construction of the optical transmission system according to the present invention.

DESCRIPTION OF THE PREFERRED EMBODIMENTS OUTLINE OF CONSTRUCTION OF PRESENT INVENTION (FIG. 3)

FIG. 3 is a diagram illustrating an outline of the construction of the optical transmission system according to the present invention.

In FIG. 3, reference PTCT1 and PTCT2 denote a pair of protection system optical transmission lines where one of the pair transmits optical signals in one direction and the other of the pair transmits optical signals in the opposite direction, and the pair is the same as the pair of protection system optical transmission lines in FIGS. 1 and 2. WK11 and WK12 denote a first pair of working system optical transmission lines where one of the pair transmits optical signals in one direction and the other of the pair transmits optical signals in the opposite direction, and the pair is the same as the pair of working system optical transmission lines in FIGS. 1 and 2. WK21 and WK22 denote a second pair of working system optical transmission lines, TE1 and TE2 denote two pieces of protection system terminal equipment provided at both ends of the protection system optical transmission lines, TE3 and TE4 denote two pieces of working system terminal equipment provided at both ends of the first pair of working system optical transmission lines, and TE5 and TE6 denote two pieces of working system terminal equipment provided at both ends of the second pair of working system optical transmission lines, 7 and 8 each denote an optical transmission line in each terminal station, and the optical transmission lines are the same as the corresponding optical transmission line in each terminal station in FIGS. 1 and 2. In addition, reference numeral 10 denotes the protection system, 20 denotes the above first working system, and 30 denotes the above second working system. In FIG. 3, the optical regenerating repeaters provided on the optical transmission lines, are not shown. Further, LINE AIS denotes the above-mentioned (in the SUMMARY OF THE INVENTION) first alarm indication signal (transmission line alarm indication signal), and PATH AIS denotes the above-mentioned second alarm indication signal.

According to the first aspect of the present invention, when trouble (B) is detected in the protection system optical transmission line PTCT1 during use of the protection system optical transmission line PTCT1, the trouble B is detected as an abnormality of a signal received by an optical regenerating repeater provided downstream of the location of the trouble, and a first alarm indication signal (transmission line alarm indication signal) LINE AIS is transmitted to the protection system terminal equipment TE2 located downstream of the optical regenerating repeater. When the protection system terminal equipment TE2 on the downstream side receives the first alarm indication signal LINE AIS, the protection system terminal equipment TE2 transmits the far end receive failure signal (FERF) through the other protection system optical transmission line PTCT2, which optical transmission line makes the pair of the protection system optical transmission lines together with the optical transmission line through which the terminal equipment TE2 has received the first alarm indication signal LINE AIS, to the protection system terminal equipment TE1, which is located opposite to the protection system terminal equipment TE2. Further, different from the conventional system, the protection system terminal equipment TE2 does not relay the first alarm indication signal LINE AIS to the optical transmission line 8 in the terminal station. According to the present invention, the protection system terminal equipment TE2 transmits a second alarm indication signal, which is generated in the second alarm indication signal generating means in the terminal equipment TE2 in response to detection of the receipt of the first alarm indication signal LINE AIS, to the pieces TE4 and TE6 of working system terminal equipment in the same terminal station through the optical transmission line 8. According to the present invention, this second alarm indication signal indicates the occurrence of the abnormality in the protection system optical transmission line without being detected by the first alarm indication signal detecting means in the optical working system terminal equipment.

Therefore, the pieces TE4 and TE6 of working system terminal equipment do not output the switch trigger signal (SW TRG) which activates the switch control circuit (not shown), and the switch control circuit receives the switch trigger signal (SW TRG) from the protection system terminal equipment TE2 only. Thus, it is possible to correctly recognize that the trouble has occurred in the protection system optical transmission line PTCT1 to which the protection system terminal equipment TE2 is connected as a piece of terminal equipment on the reception side.

Further, according to the second aspect of the present invention, when the protection system terminal equipment receives the far end receive failure signal (FERF), the protection system terminal equipment does not relay the same to the pieces of working system terminal equipment in the same station, and erases the far end receive failure signal (FERF). Therefore, the pieces of working system terminal equipment do not respond to the far end receive failure signal (FERF) generated by the protection system terminal equipment in response to trouble occurring in the protection system optical transmission line.

In addition, when trouble occurs at the location "C" on the optical transmission line 8 in the terminal station as indicated in FIG. 2, the switch trigger signals (SW TRG) are generated from all the pieces of working system terminal equipment downstream of the location of the trouble. Therefore, the switch control circuit which receives these switch trigger signals (SW TRG), can recognize the location of the trouble on the optical transmission line 8 based from the information on the pieces of terminal equipment which generate the switch trigger signals (SW TRG).

Figure 4:
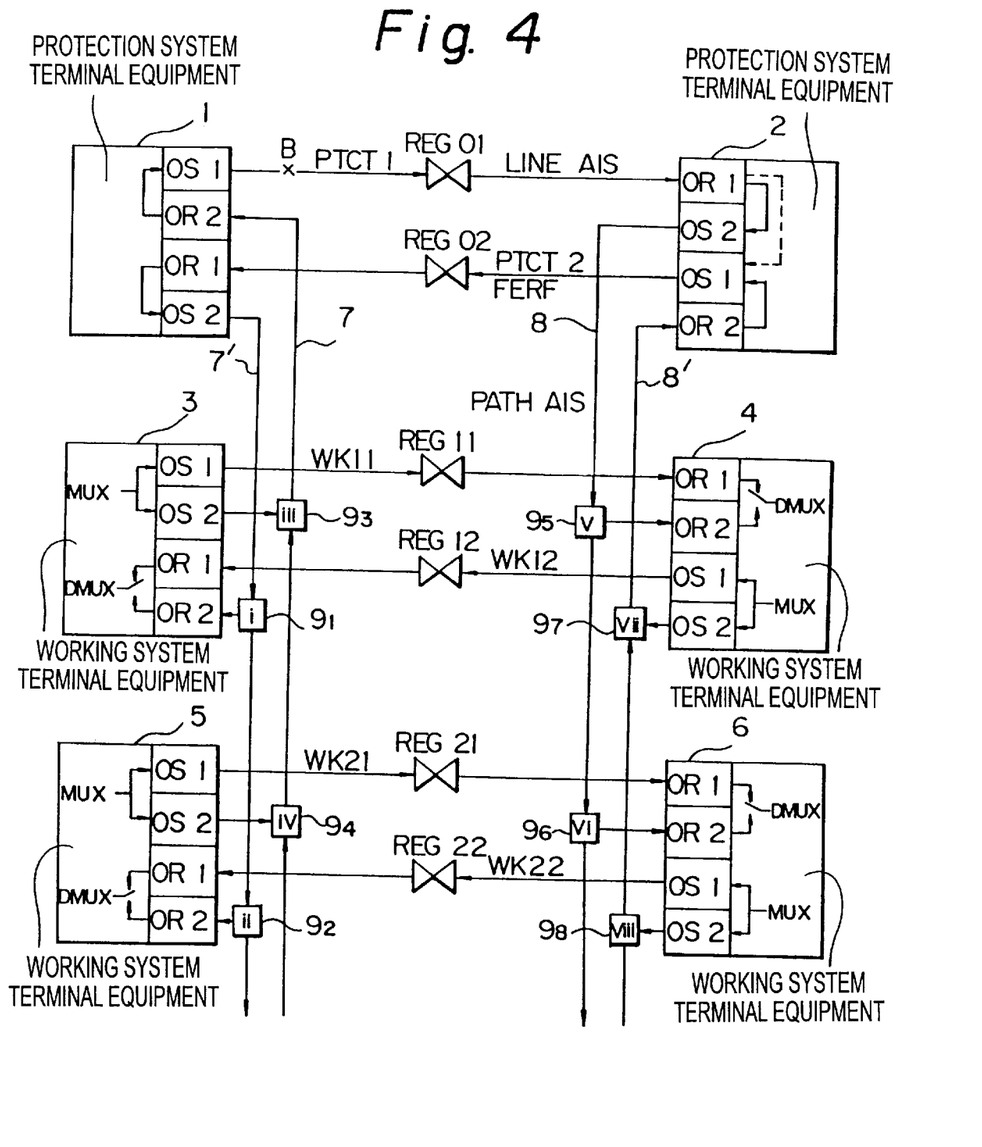
FIG. 4 is a diagram illustrating flows of signals in the construction of FIG. 1 when trouble occurs on the protection system optical transmission line in the embodiment of the present invention.

CONCRETE EXAMPLE (FIG. 4)

FIG. 4 is a diagram illustrating an embodiment of the optical transmission apparatus to which the present invention is applied. The construction of FIG. 4 and the operations thereof are the same as the constructions of FIGS. 1 and 2 and operations thereof, except the portions relating to the characteristic features of the present invention. In FIG. 4, the same elements as the elements in FIG. 1, 2, and 3 respectively have the same references as those in FIG. 1, 2, and 3.

As explained with reference to FIG. 3, when trouble B occurs in the protection system optical transmission line PTCT1, a transmission line alarm indication signal LINE AIS is generated in the optical regenerating repeater REG01. When the transmission line alarm indication signal LINE AIS is received by the protection system terminal equipment 2, the protection system terminal equipment 2 does not relay the transmission line alarm indication signal LINE AIS to the optical transmission line 8 in the terminal station, and generates a second alarm indication signal PATH AIS to transmit the same onto the optical transmission line 8.

Figure 5:
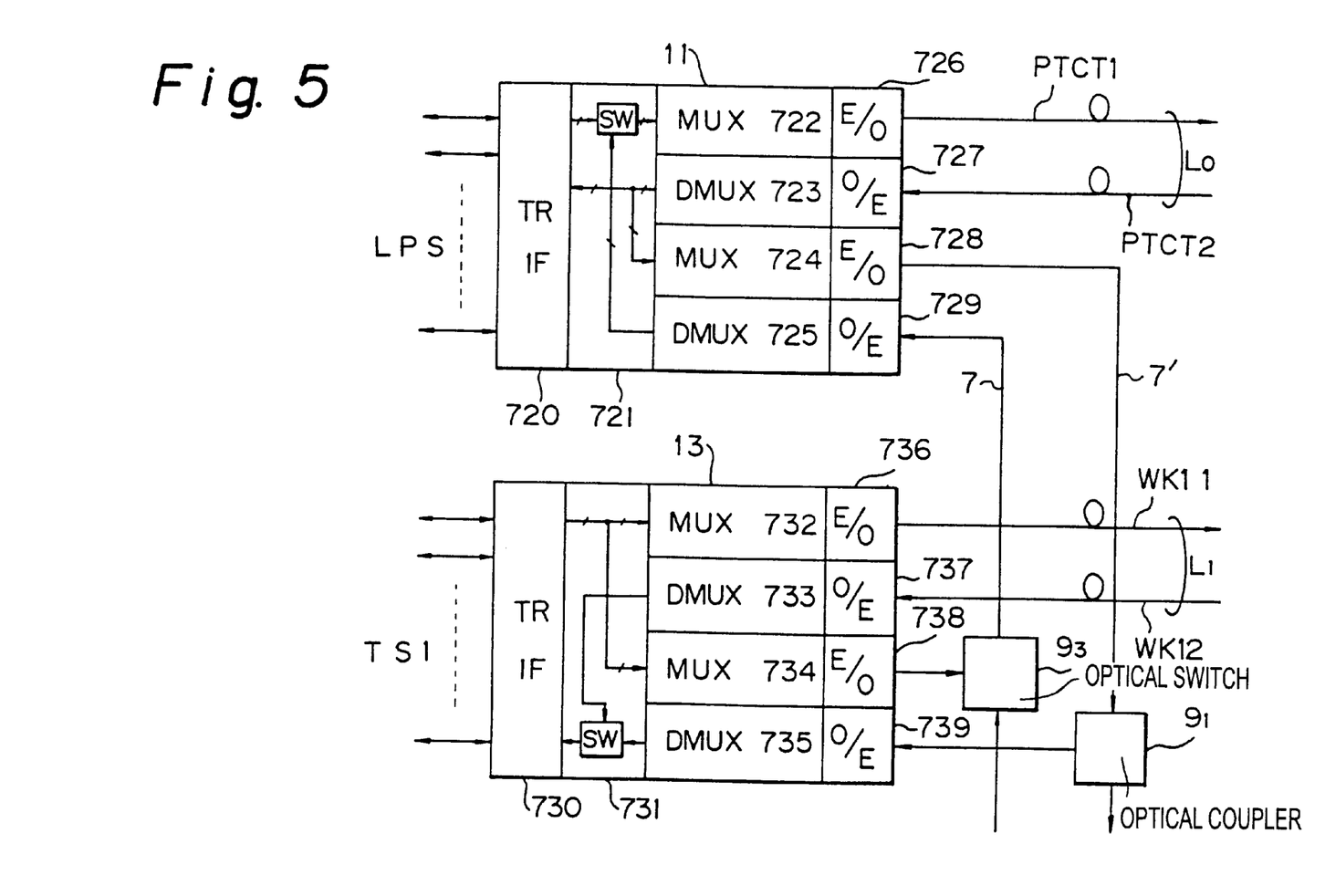
FIG. 5 is a diagram illustrating a variation of the construction of the optical protection system terminal equipment and optical working system terminal equipment in the embodiment of present invention.

FIG. 5 is a diagram illustrating a variation of the construction of the optical protection system terminal equipment and optical working system terminal equipment in the embodiment of the present invention. In FIG. 5, reference numeral 11 denotes a piece of protection system terminal equipment corresponding to protection system terminal equipment in FIG. 4, and 13 denotes a piece of working system terminal equipment corresponding to the working system terminal equipment 3 in FIG. 4. In FIG. 5, LPS denotes a low priority signal, TR IF denotes a tributary signal interface, TS1 denotes a plurality of tributary signals, 721 and 731 each denote a switch portion, E/O denotes an electric to optical conversion circuit, O/E denotes an optical to electric conversion circuit, MUX denotes a multiplexer circuit, DMUX denotes a demultiplexer circuit, SW denotes a two-input/one-output selection switch circuit. In FIG. 5, the same elements as the elements in FIGS. 1, 2, 3 and 4 respectively have the same references as those in FIGS. 1, 2, 3 and 4.

In the construction of FIG. 5, the first and second transmission portions in the protection system terminal equipment 1 and working system terminal equipment 3 each contain a multiplexer circuit MUX and an electric to optical conversion circuit E/O. The first and second reception portions each contain an optical to electric conversion circuit O/E and a demultiplexer circuit DMUX. When the construction of FIG. 5 is compared with the constructions of FIGS. 1, 2, and 4, the locations of the switch portions (721 or 731) and the stages of multiplexing and demultiplexing (comprising multiplexer circuit MUX and demultiplexer circuit DMUX) are replaced with each other.

In the construction of FIG. 5, the tributary signal TS1 which is input into the working system terminal equipment 13, is input into the switch portion 731 through the tributary signal interface TR IF. In the switch portion 731, the tributary signal TS1 is applied in parallel to the multiplexer circuits 732 and 734 in the first and second transmission portions to be respectively multiplexed therein. Next, the multiplexed signals are converted to optical signals in the electric to optical conversion circuits E/O 736 and 738, respectively. When the working system optical transmission lines WK11 and WK12 are used, the optical signal output from the electric to optical conversion circuit E/O 736, is transmitted through the working system optical transmission line WK11 to the working system terminal equipment in the opposite terminal station. When the working system terminal equipment 13 transmits to and receives from the opposite terminal station optical signals through the protection system optical transmission lines PTCT1 and PTCT2, the optical signal output from the electric to optical conversion circuit E/O 738 in the working system terminal equipment 13 is transmitted through the optical coupler (or optical switch) 93 and the optical transmission line 7 in the terminal station to the optical to electric conversion circuit O/E 729 in the second reception portion of the protection system terminal equipment 11. In the optical to electric conversion circuit O/E 729 in the second reception portion of the protection system terminal equipment 11, the optical signal is converted to an electric signal, and the electric signal is demultiplexed to a plurality of electric signals in the demultiplexer circuit DMUX 725, and then the plurality of electric signals is applied to one of the two inputs of the switch circuit SW in the switch portion 721. When the protection system optical transmission lines PTCT1 and PTCT2 are not used by one of the pieces of working system terminal equipment, the switch circuit SW in the switch portion 721 selects a low priority signal LPS which is supplied to the protection system terminal equipment 11 to supply the same to the multiplexer circuit MUX 722 in the first transmission portion. When the protection system optical transmission lines PTCT1 and PTCT2 are used by one of the pieces of working system terminal equipment, the switch circuit SW in the switch portion 721 selects the output of the demultiplexer circuit DMUX 725 in the second reception portion to supply the same to the multiplexer circuit MUX 722 in the first transmission portion. In the multiplexer circuit MUX 722 in the first transmission portion, the supplied signal is multiplexed, and the multiplexed signal is converted to an optical signal in the electric to optical conversion circuit E/O 726 to transmit the same through the protection system optical transmission line PTCT1. Thus, the signal output from the first transmission portion in the working system terminal equipment 13, is relayed with regeneration (repeated) in the protection system terminal equipment 11 to transmit to the protection system optical transmission line PTCT1.

On the other hand, the signal transmitted through the protection system optical transmission line PTCT2, is converted to an electric signal in the optical to electric conversion circuit O/E 727 in the first reception portion in the protection system terminal equipment 11, and is then demultiplexed to a plurality of electric signals in the demultiplexer circuit DMUX 723. When the protection system optical transmission lines PTCT1 and PTCT2 are used by one of the pieces of working system terminal equipment, the plurality of electric signal are supplied to the multiplexer circuit MUX 724 in the second transmission portion. In the multiplexer circuit MUX 724 in the second transmission portion, these signals are multiplexed, and the multiplexed signal is converted to an optical signal in the electric to optical conversion circuit E/O 728 to transmit the same through the optical transmission line 7' and the optical coupler (or optical switch) 91 to the optical to electric conversion circuit O/E 739 in the second reception portion of the working system terminal equipment 13. In the optical to electric conversion circuit O/E 739 in the second reception portion of the working system terminal equipment 13, the received optical signal is converted to an electric signal, and is then demultiplexed to a plurality of electric signals in the demultiplexer circuit DMUX 723, and the same is applied to one of the two inputs of the switch circuit SW in the switch portion 731. When the protection system optical transmission lines PTCT1 and PTCT2 are not used by one of the pieces of working system terminal equipment, the switch circuit SW in the switch portion 731 selects the plurality of electric signals output from the demultiplexer circuit DMUX 733 which demultiplexes signals transmitted through the working system optical transmission line WK12. When the protection system optical transmission lines PTCT1 and PTCT2 are used by one of the pieces of working system terminal equipment, the switch circuit SW in the switch portion 731 selects the output of the demultiplexer circuit DMUX 735 in the second reception portion to supply the same to the tributary signal interface TR IF 730.

Figure 6:
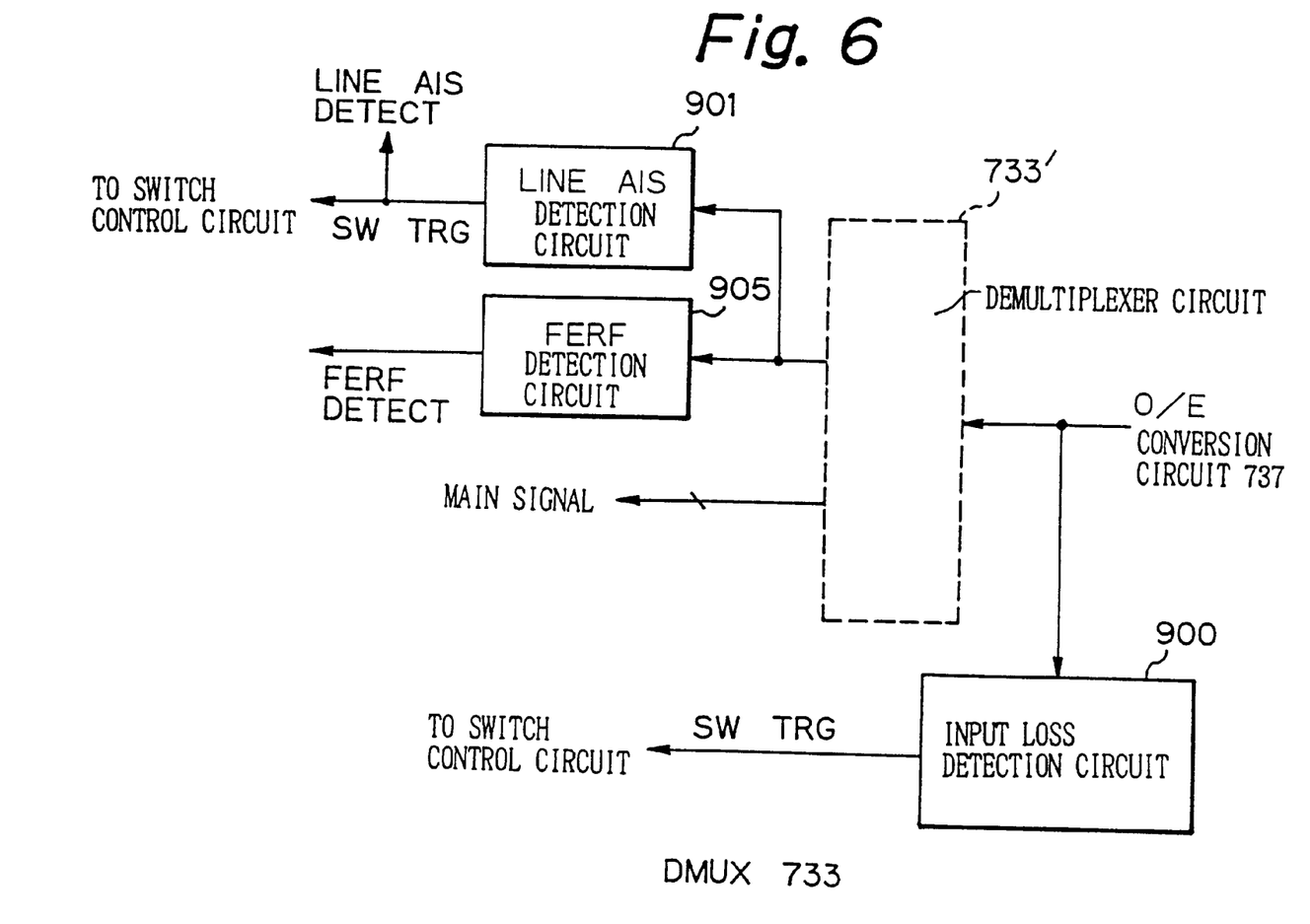
FIG. 6 is a diagram illustrating an example construction relating to the present invention, of the demultiplexer 733 in the construction of FIG. 5.
Figure 7:
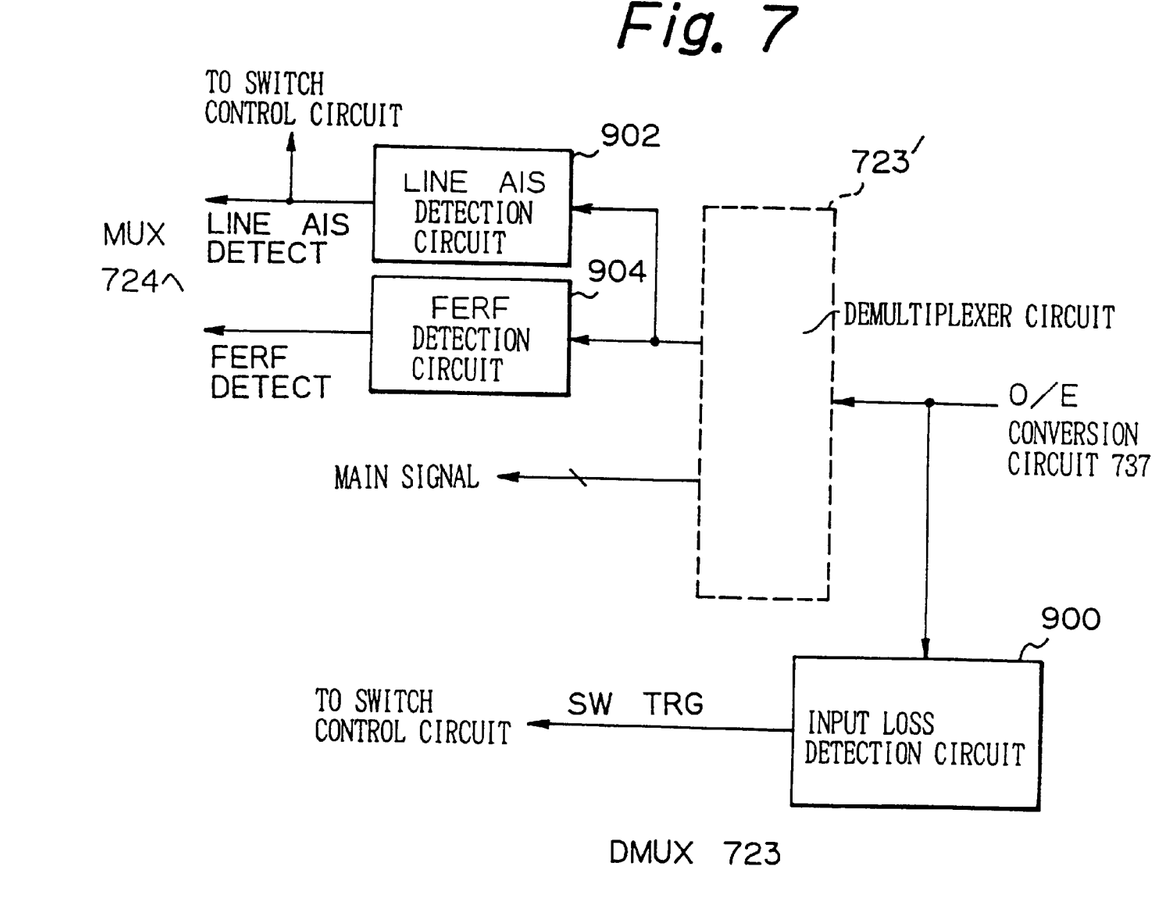
FIG. 7 is a diagram illustrating an example construction relating to the present invention, of the demultiplexer 723 in the construction of FIG. 5.
Figure 8:
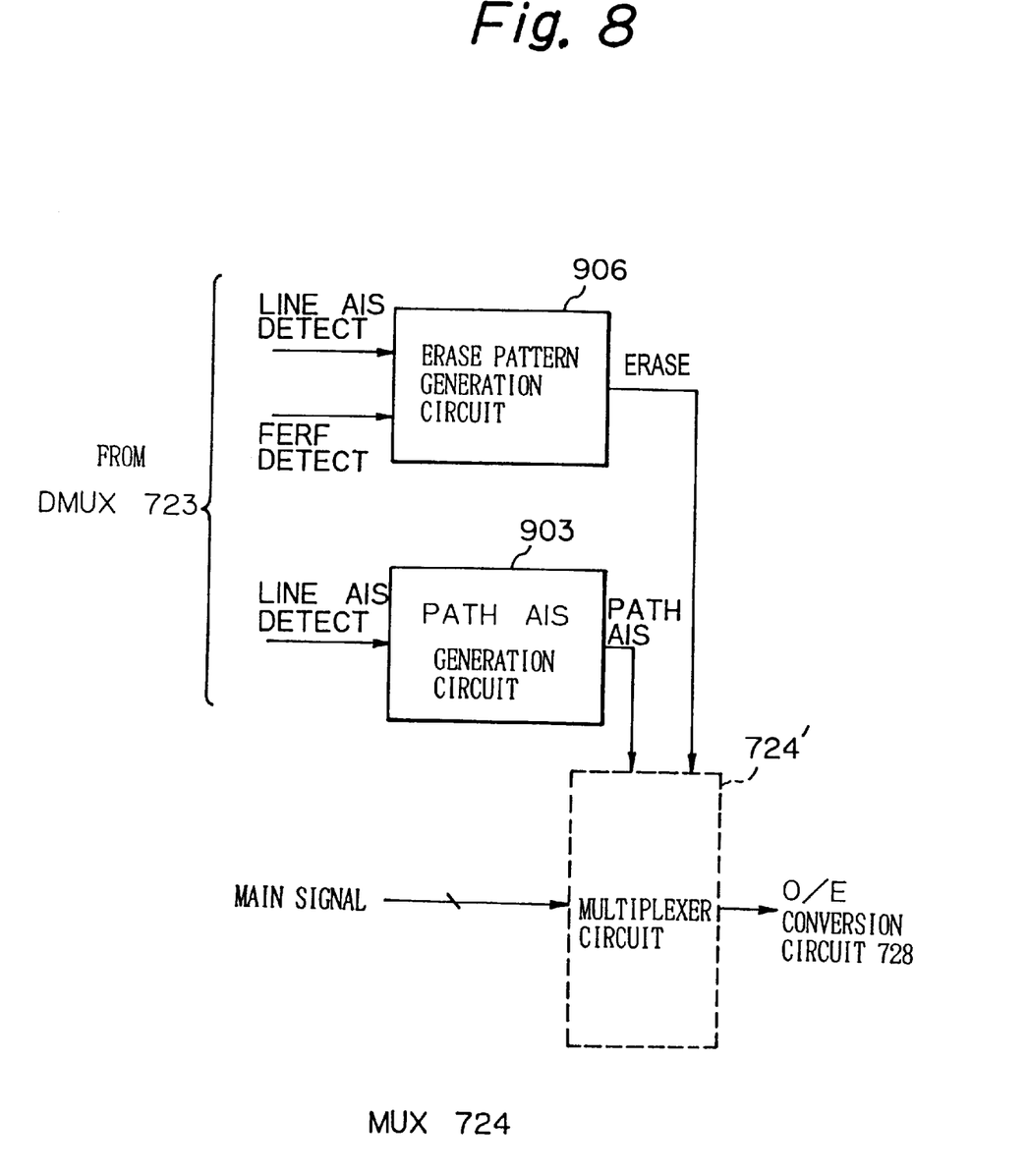
FIG. 8 is a diagram illustrating an example construction relating to the present invention, of the demultiplexer 724 in the construction of FIG. 5.

CONSTRUCTION FOR DETECTION AND GENERATION OF ALARM INDICATION SIGNAL (FIGS. 6, 7, and 8)

The construction for the detection of the first alarm indication signal LINE AIS and the generation of the second alarm indication signal PATH AIS according to the present invention, can be incorporated in the demultiplexer circuit DMUX and multiplexer circuit MUX of FIG. 5 in a form of hardware logic circuitry, as explained below with reference to FIGS. 6, 7, and 8.

FIG. 6 is a diagram illustrating an example construction relating to the present invention, in the demultiplexers 733 and 735 in the working system terminal equipment 13 of FIG. 5. Although the explanation is given for the demultiplexer circuit 733 with reference to FIG. 6, the demultiplexer circuit 735 has the same construction as the demultiplexer circuit 733. In FIG. 6, reference numeral 733' denotes a demultiplexer realizing the demultiplexing function of the demultiplexer circuit 733; 900 denotes an input loss detection circuit, 901 denotes a LINE AIS detection circuit; and 905 denotes an FERF detection circuit. When loss of the input of the first and second reception portion in the working system terminal equipment 13 occurs such as an abnormal lowering of the level of the optical signal, and the like, the input loss detection circuit 900 detects the loss of the input, generates a switch trigger signal (SW TRG), and transmits the same to the switch control circuit (not shown).

In addition, data (bit sequence) is stored in a predetermined area in the reception frame area, where the predetermined area is commonly assigned for the first alarm indication signal LINE AIS. Far end receive failure signal (FERF) as explained later, is demultiplexed in the demultiplexer circuit 733' to supply the same to the LINE AIS detection circuit 901 and the FERF detection circuit 905. The LINE AIS detection circuit 901 determines whether or not a predetermined bit pattern indicating the LINE AIS is written in this area (by the optical regenerating repeater REG on the optical transmission line). When it is determined that the pattern is written, the LINE AIS detection circuit 901 generates a switch trigger signal (SW TRG) to transmit the same to the switch control circuit. The FERF detection circuit 905 determines whether or not another predetermined bit pattern indicating the FERF is written in this area (by the opposite protection system terminal equipment). For example, the information is indicated on a panel (not shown) as information indicating the status of the system.

Therefore, when the first alarm indication signal LINE AIS, generated on the protection system optical transmission line, is simply relayed by the protection system terminal equipment 11 to be transmitted through the optical transmission line in the terminal station to the second reception portions in the pieces of working system terminal equipment, the LINE AIS detection circuit 901 detects the first alarm indication signal LINE AIS to generate the switch trigger signal (SW TRG) and transmit the same to the switch control circuit (not shown).

FIG. 7 is a diagram illustrating an example construction relating to the present invention, in the demultiplexer 723 in the protection system terminal equipment 11 in the construction of FIG. 5. In FIG. 7, reference numeral 723' denotes a demultiplexer realizing the demultiplexing function of the demultiplexer circuit 723, 900 denotes an input loss detection circuit; 902 denotes a LINE AIS detection circuit; and 904 denotes an FERF detection circuit. When loss of an input occurs at the input of the first reception portion of the working system terminal equipment 13, such as an abnormal lowering of the level of the optical signal, and the like, input loss detection circuit 900 detects the loss of the input to generate a switch trigger signal (SW TRG) and transmit the same to the switch control circuit (not shown).

In addition, data (bit sequence) is stored in a predetermined area in the reception frame area, where the predetermined area is commonly assigned for the first alarm indication signal LINE AIS. Far end receive failure signal (FERF) as explained later, is demultiplexed in the demultiplexer circuit 723' to supply the same to the LINE AIS detection circuit 902 and the FERF detection circuit 904. The LINE AIS detection circuit 902 determines whether or not the predetermined bit pattern is written in this area (by the optical regenerating repeater REG on the optical transmission line). When it is determined that the pattern is written, the LINE AIS detection circuit 901 generates a LINE AIS detection signal (LINE AIS DETECT) to transmit the same to the multiplexer circuit 724 in the protection system terminal equipment 11. The FERF detection circuit 904 determines whether or not the other predetermined bit pattern indicating the FERF is written in this area (by the opposite protection system terminal equipment). When it is determined that the other pattern is written, the information is indicated, for example, on a panel (not shown) as information indicating the status of the system, and the FERF detection circuit 904 generates an FERF detection signal (FERF DETECT) to supply the same to the multiplexer circuit 724 in the protection system terminal equipment 11.

FIG. 8 is a diagram illustrating an example construction relating to the present invention, in the multiplexer 724 in the protection system terminal equipment 11 of FIG. 5. In FIG. 8, 724' denotes a multiplexer realizing the functions of the multiplexer circuit 724; 903 denotes a PATH AIS generation circuit; and 906 denotes an erase pattern generation circuit.

When the above LINE AIS detection signal (LINE AIS DETECT) is supplied from the LINE AIS detection circuit 902 in FIG. 7 to the PATH AIS generation circuit 903, the PATH AIS generation circuit 903 generates a predetermined pattern for indicating a PATH AIS signal (for example, all one's) to supply the same to the multiplexer circuit 724'. The pattern is inserted into a predetermined area in a transmission frame, where the predetermined area is assigned for the second alarm indication signal PATH AIS. Simultaneously, in response to the above LINE AIS detection signal (LINE AIS DETECT), the erase pattern generation circuit 907 writes in the transmission frame a bit pattern for erasing the bit pattern indicating the first alarm indication signal LINE AIS, which is written in the predetermined area commonly assigned to the first alarm indication signal LINE AIS and the far end receive failure signal (FERF). Therefore, when the protection system terminal equipment 11 receives at the first reception portion thereof a reception frame containing the first alarm indication signal LINE AIS, the transmission frame which is output from the multiplexer circuit 724 in the second transmission portion of the protection system terminal equipment 11, indicates that the first alarm indication signal LINE AIS is inactive, and instead of that, the second alarm indication signal PATH AIS is active. Thus, this transmission frame is not detected as the first alarm indication signal LINE AIS by the second reception portion which contains the demultiplexer circuit 735 in the working system terminal equipment 13, where the demultiplexer circuit 735 has the construction of FIG. 6, and therefore the working system terminal equipment 13 does not generates a switch trigger signal (SW TRG) for the trouble occurring on the protection system optical transmission line.

When the above erase pattern generation circuit 906 receives the FERF detection signal (FERF DETECT) which is generated in the FERF detection circuit 904 in the demultiplexer circuit 723 in the first reception portion of the protection system terminal equipment 11 in response to detection of the far end receive failure signal (FERF), the erase pattern generation circuit 906 writes in the transmission frame a bit pattern for erasing the bit pattern indicating the far end receive failure signal (FERF), which is written in the predetermined area commonly assigned to the first alarm indication signal LINE AIS and the far end receive failure signal (FERF). Therefore, the far end receive failure signal (FERF) received by the protection system terminal equipment is not relayed to the working system terminal equipment in the same station, and therefore, the working system terminal equipment does not receive the far end receive failure signal (FERF) when trouble occurs on the protection system optical transmission line.

Although not shown, a construction for generating a far end receive failure signal (FERF) in response to detection of reception of the first alarm indication signal LINE AIS, may be realized by generating a predetermined pattern for the far end receive failure signal (FERF) by a hardware logic circuit and inserting the same into a predetermined area in the transmission frame. This construction may be incorporated in each of the multiplexer circuits 722 and 732 in the terminal equipment in the first transmission portions of the protection system terminal equipment 11 and the working system terminal equipment 13 respectively.

The first and second transmission portion and first and second reception portion in FIGS. 4 and 5 may be constructed as a common hardware logic circuit which contains all the above functions.

Figure 9:
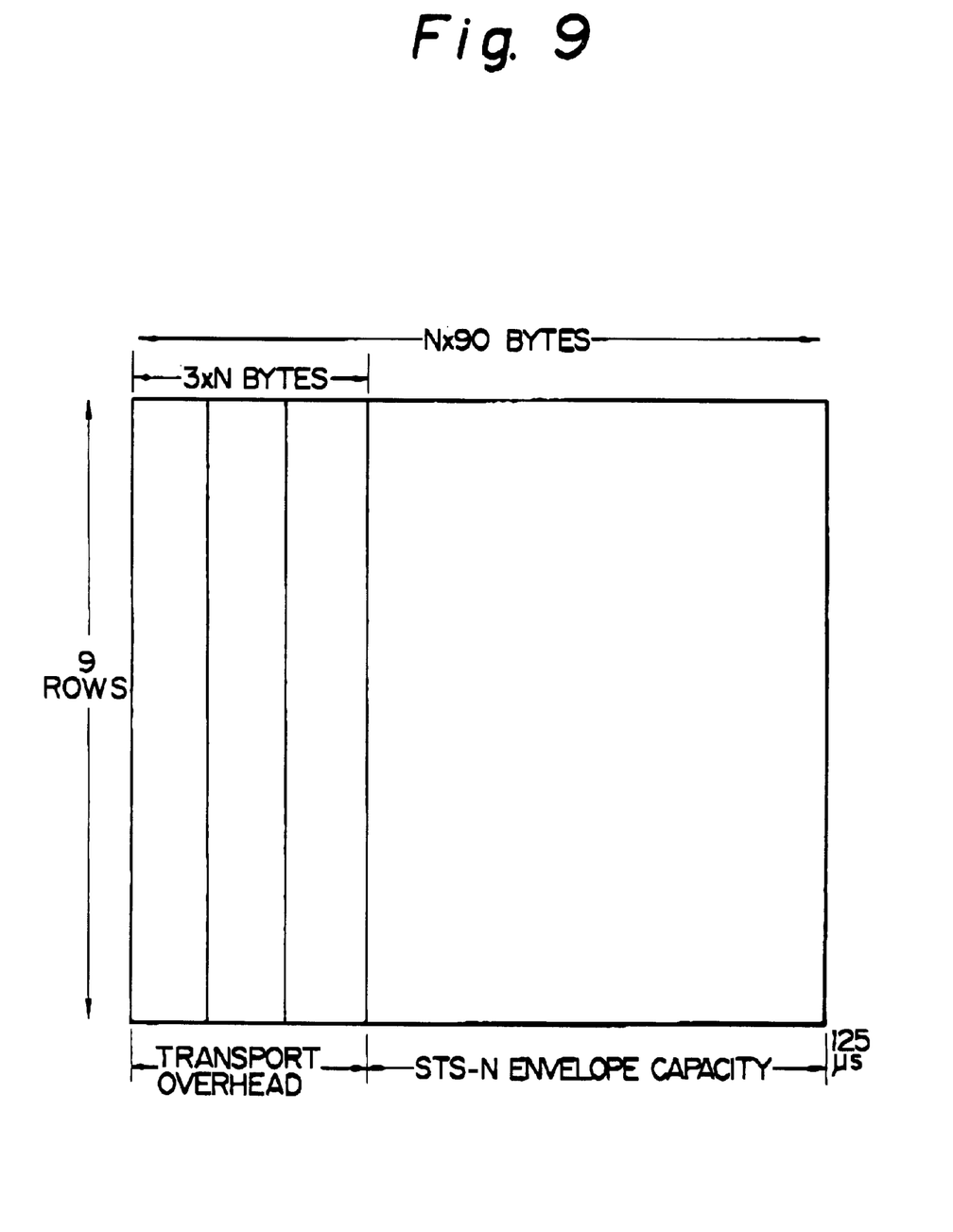
FIG. 9 is a diagram illustrating the frame format of STS-N in the SONET system, as an example frame format used in the embodiment of present invention.
Figure 10:
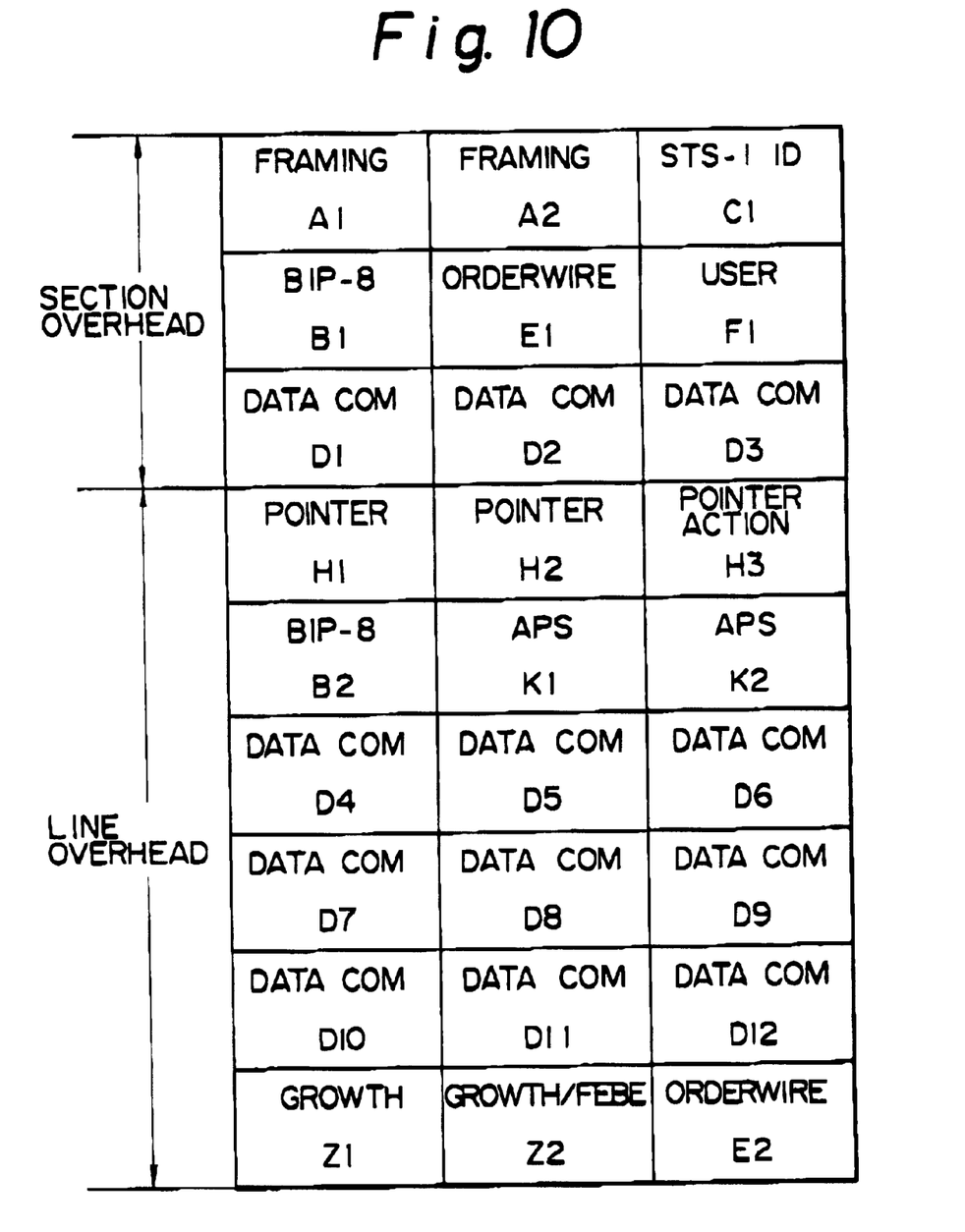
FIG. 10 is a diagram illustrating the configuration of the transport overhead in the STS-N frame format of FIG. 9, and areas of LINE AIS and PATH AIS.

AREA FOR ALARM INDICATION SIGNAL (FIGS. 9 and 10)

FIG. 9 is a diagram illustrating the frame format of STS-N in the SONET system, being an example frame format used in the embodiment of present invention, and FIG. 10 is a diagram illustrating the configuration of the transport overhead in the STS-N frame format of FIG. 9, and areas of LINE AIS and PATH AIS.

The byte K2, which is indicated in the transport overhead in FIG. 10, is commonly assigned for the first alarm indication signal LINE AIS and the far end receive failure signal (FERF), and the bytes Hi and H2, which are indicated in the transport overhead in FIG. 10, are commonly assigned for the second alarm indication signal PATH AIS.

What is claimed is:

1. An optical transmission system for communicating between first and second terminal stations, having a working system providing a first connection between the first and second terminal stations and a protection system used as a stand-by system of the working system and providing a second connection between the first and second terminal stations, said optical transmission system comprising:

first and second working optical transmission lines, each having respective first and second ends respectively disposed at and coupled to the first and second terminal stations, the first working optical transmission line transmitting a first optical signal from the first terminal station to the second terminal station and the second working optical transmission line transmitting a second optical signal from the second terminal station to the first terminal station;

first and second protection optical transmission lines, each having respective first and second ends respectively disposed at and coupled to the first and second terminal stations, the first protection optical transmission line transmitting a third optical signal from the first terminal station to the second terminal station and the second protection optical transmission line transmitting a fourth optical signal from the second terminal station to the first terminal station;

first and second optical working system terminal units located in the respective first and second terminal stations and terminating the respective first and second ends of each of said first and second working optical transmission lines;

first and second optical protection system terminal units located in the respective first and second terminal stations and terminating the respective first and second ends of each of said first and second protection optical transmission lines;

a first bidirectional optical transmission line connecting said first optical working system terminal unit with said first optical protection system terminal unit;

a second bidirectional optical transmission line connecting said second optical working system terminal unit with said second optical protection system terminal unit;

said first optical protection system terminal unit further comprising first relay means for relaying said fourth optical signal transmitted through said second protection optical transmission line to said first bidirectional optical transmission line;

said second optical protection system terminal unit further comprising second relay means for relaying said third optical signal transmitted through said first protection optical transmission line to said second bidirectional optical transmission line;

four optical signal repeaters respectively inserted between said respective first and second ends of said first working transmission line, said second working transmission line, said first protection transmission line and said second protection transmission line, each of said optical signal repeaters further comprising first alarm indication signal generating means for detecting an abnormality in the optical signal transmitted through the respective transmission line and, in response thereto, generating a first alarm indication signal and for transmitting said first alarm indication signal through said respective transmission line and toward a downstream side of said respective transmission line;

each of said first and second optical protection system terminal units and said first and second optical working system terminal units further comprising first alarm indication signal detecting means for receiving and detecting said first alarm indication signal transmitted through and toward the downstream side of said respective transmission line; and each of said first and second relay means further comprising second alarm indication signal generating means for generating and transmitting a second alarm indication signal without transmitting said first alarm indication signal through a corresponding one of said first and second optical bidirectional transmission lines in response to said detection of said first alarm indication signal, wherein said first alarm indication signal detecting means of said first and second optical working system terminal units do not detect said second alarm indication signal.

2. The optical transmission system as claimed in claim 1, wherein predetermined bit patterns are inserted in first and second areas of a transmission frame of a predetermined format, to generate said first and second alarm indication signals, respectively.

3. The optical transmission system as claimed in claim 2, wherein each of said first and second alarm indication signal detecting means comprises:

a pattern detection circuit for detecting said predetermined bit patterns in said first and second predetermined areas in said predetermined format, respectively.

4. The optical transmission system as claimed in claim 2, wherein each of said first and second alarm indication signal generating means comprises:

a pattern generation circuit for generating and inserting the respectively predetermined patterns into said first and second areas in the predetermined format, respectively.

5. The optical transmission system as claimed in claim 1, wherein:

each of said first and second optical working system terminal units and said first and second optical protection system terminal units further comprises:

far end receive failure signal generating means for generating a far end receive signal failure signal indicating that one of said first through fourth optical signals received by an opposite terminal station has said abnormality, in response to said detection of said first alarm indication signal, and for transmitting the far end receive signal failure signal through one of said transmission lines forming a pair with another of said transmission lines through which said one of said first and second optical working system terminal units and said first and second optical protection system terminal units has received said first alarm indication signal;

far end receive failure detecting means for detecting reception of said far end receive failure signal; and each of said first and second relay means further comprises:

far end receive failure signal deleting means for deleting said far end receive failure signal in response to detection of said far end said far end receive failure signal, without relaying said far end receive failure signal.

6. An optical transmission system for communicating between first and second terminal stations, having a working system providing a first connection between the first and second terminal stations and a protection system used as a stand-by system of the working system and providing a second connection between the first and second terminal stations, said optical transmission system comprising:

first and second switch control circuits located in the respective first and second terminal stations;

first and second working optical transmission lines, each having first and second ends respectively disposed at and coupled to the first and second terminal stations, transmitting respective first and second optical signals from the respective first and second terminal stations to the other terminal station;

first and second protection optical transmission lines, each having first and second ends respectively disposed at and coupled to the first and second terminal stations, transmitting respective third and fourth optical signals from the respective first and second terminal stations to the other terminal station;

first and second optical working system terminal units located in the respective first and second terminal stations and terminating the respective first and second ends of said first and second working optical transmission lines;

first and second optical protection system terminal units located in the respective first and second terminal stations and terminating the respective first and second ends of said first and second protection optical transmission lines;

a first bidirectional optical transmission line connecting said first optical working system terminal unit with said first optical protection system terminal unit;

a second bidirectional optical transmission line connecting said second optical working system terminal unit with said second optical protection system terminal unit;

each of said first working transmission line, said second working transmission line, said first protection transmission line and said second protection transmission line further comprising first alarm indication signal generating means for detecting an abnormality in a respective one of said optical signals and, in response thereto, generating a first alarm indication signal and for transmitting said first alarm indication signal through said respective transmission line, toward a downstream side of said respective transmission line; and each of said first and second optical protection system terminal units further comprising means for transmitting a second alarm indication signal which does not activate said switch control circuits, through one of said first and second bidirectional optical transmission lines connected to said one of said first and second optical protection system terminal units receiving said first alarm indication signal, in response to said first alarm indication signal, and preventing transmission of said first alarm indication signal.

7. The optical transmission system of claim 6, wherein each of said means for transmitting said second alarm indication signal further comprises:

relay means for relaying the optical signal transmitted through the respective one of said first and second protection optical transmission lines to one of said first and second bidirectional transmission lines connected to one of said first and second optical protection system terminal units receiving the optical signal transmitted through the respective one of said first and second optical transmission lines.

8. A transmission system for communicating between first and second terminal stations, having a working system providing a first connection between the first and second terminal stations and a protection system used as a stand-by system of the working system and providing a second connection between the first and second terminal stations, said transmission system comprising:

first and second switch control circuits located in the respective first and second terminal stations;

first and second working transmission lines, each having first and second ends respectively disposed at and coupled to the first and second terminal stations, the first working transmission line transmitting a first signal from the first terminal station to the second terminal station, and the second working terminal transmission line transmitting a second signal from the second terminal station to the first terminal station;

first and second protection transmission lines, each having first and second ends respectively disposed at and coupled to the first and second terminal stations, the first protection transmission line transmitting a third signal from the first terminal station to the second terminal station, and the second protection transmission line transmitting a fourth signal from the second terminal station to the first terminal station;

first and second working system terminal units located in the respective first and second terminal stations and terminating the respective first and second ends of each of said first and second working transmission lines;

first and second protection system terminal units located in the respective first and second terminal stations and terminating the respective first and second ends of each of said first and second protection transmission lines;

a first bidirectional transmission line connecting said first working system terminal unit with said first protection system terminal unit;

a second bidirectional transmission line connecting said second working system terminal unit with said second protection system terminal unit;

four signal repeaters respectively inserted between said respective first and second ends of said first working transmission line, said second working transmission line, said first protection transmission line and said second protection transmission line, each of said signal repeaters comprising first alarm indication signal generating means for detecting an abnormality in the respective first through fourth signals and, in response thereto, generating a first alarm indication signal and for transmitting said first alarm indication signal through said respective transmission line, toward a downstream side of said respective transmission line; and each of said first and second protection system terminal units, in response to receiving said first alarm indication signal, transmits a second alarm indication signal which does not activate said switch control circuits, through one of said first and second bidirectional transmission lines connected to said one of said first and second protection system terminal units receiving said first alarm indication signal and does not transmit said first alarm indication signal.

* * * * *